Figure 3:
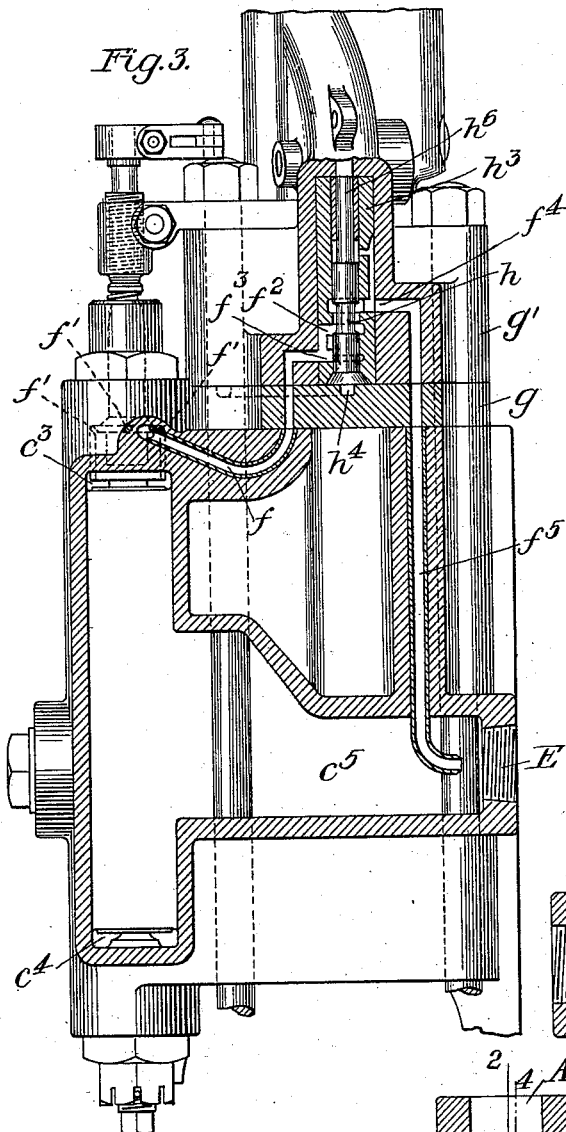

No. 842,003. PATENTED JAN. 22, 1907.
T. OFFICER & H. H. MERCER.
PRESSURE ACTUATED VALVE FOR ENGINES.
APPLICATION FILED OCT. 30, 1905.
2 SHEETS—SHEET 1.
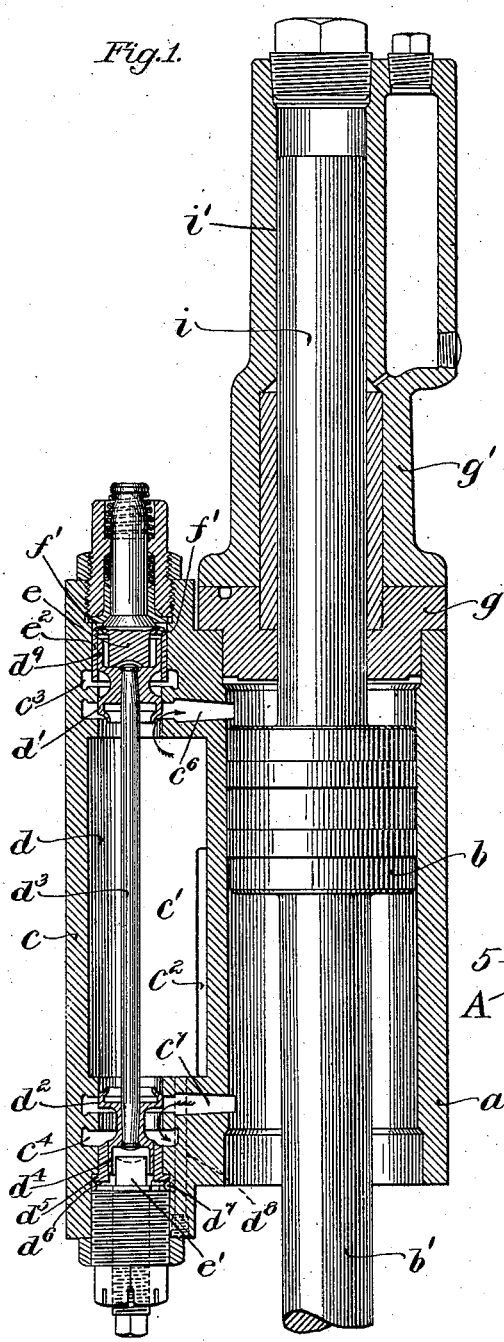
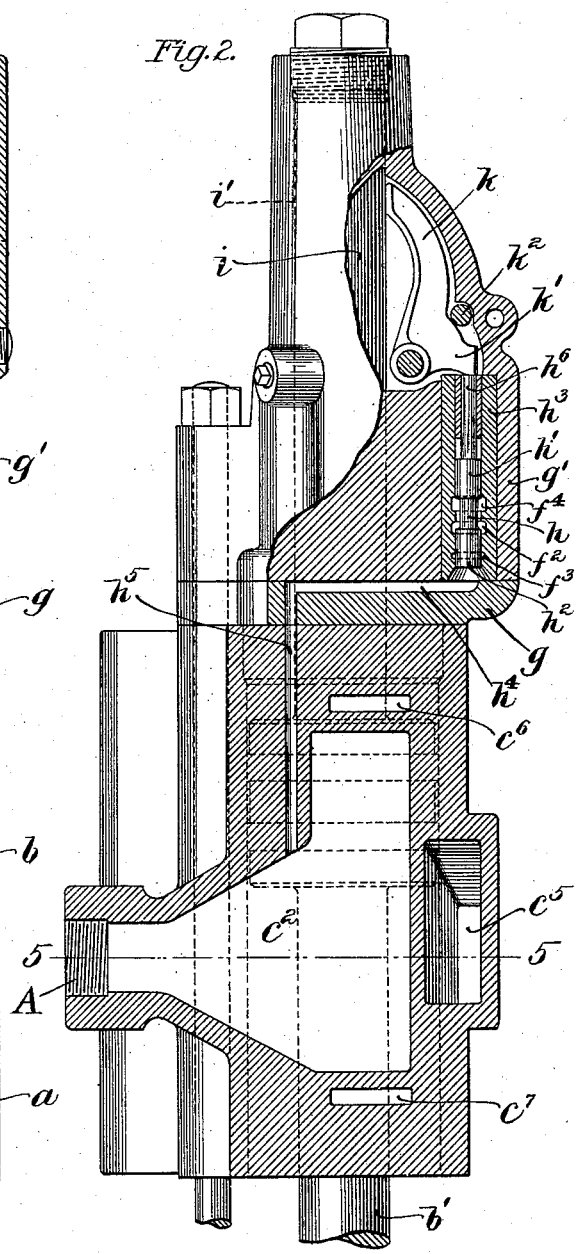
Witnesses:
Inventors:
Thomas Officer and
Henry H. Mercer
By Emery Birch Powell
Attorneys No. 842,003. PATENTED JAN. 22, 1907.
T. OFFICER & H. H. MERCER.
PRESSURE ACTUATED VALVE FOR ENGINES.
APPLICATION FILED OCT. 30, 1905.

2 SHEETS—SHEET 2.

Witnesses:

Inventors:
Thomas Officer and
Henry H. Mercer
By Emery Booth Powell
Attorneys

UNITED STATES PATENT OFFICE.

THOMAS OFFICER AND HENRY H. MERCER, OF CLAREMONT, NEW HAMPSHIRE, ASSIGNORS TO SULLIVAN MACHINERY COMPANY, OF CLAREMONT, NEW HAMPSHIRE, A CORPORATION OF MAINE.

PRESSURE-ACTUATED VALVE FOR ENGINES.

No. 842,003.

Specification of Letters Patent.

Patented Jan. 22, 1907.

Application filed October 30, 1905. Serial No. 284,991.

*To all whom it may concern:*

Be it known that we, THOMAS OFFICER and HENRY H. MERCER, both citizens of the United States, and residents of Claremont, in the county of Sullivan and State of New Hampshire, have invented an Improvement in Pressure-Actuated Valves for Engines, of which the following description, in connection with the accompanying drawings, is a specification, like letters on the drawings representing like parts.

Our invention relates to engines, and more particularly to direct-acting fluid-pressure engines—such, for instance, as are used in operating drills or other reciprocating tools, although the invention is applicable to various other purposes and other types of engines.

More particularly, in the illustrative embodiment thereof, the invention relates to that type of engine wherein there is provided a main controlling-valve actuated partially or wholly by fluid-pressure.

In Patent No. 728,283, granted to us May 19, 1903, we disclosed a direct-acting channeling-engine provided with a main piston-controlling valve controlled by pressure admitted to and exhausted from the valve-chamber through the instrumentality of an auxiliary valve, the latter therein specifically consisting of a slide-valve suitably reciprocated by a toothed collar having engagement with spiral grooves upon an extension of the piston-rod, reciprocation of the latter causing the collar to turn about the axis of the rod. With that construction, however, any shifting of the piston and its attached rod about its axis caused the collar correspondingly to shift and altered the working of the valve. This is apt to happen if the gibs at one side of the cross-head become appreciably worn or if the cross-head and piston are not assembled in exactly the right relation.

Accordingly one object of our invention is to provide means equally effective for controlling the actuating-pressure of the main valve other than those described in the said patent, but which are likely not to be thrown out of adjustment by a shifting or displacement of the piston about its axis.

Another object of our invention is to provide improved pressure-controlling means which may be employed either upon engines of the type described in the above patents or upon other types or construction of engines and without reference to the first object of the invention, as stated above.

Our invention will be best understood by reference to the following description when taken in connection with the accompanying illustration of one specific embodiment thereof, while its scope will be more particularly pointed out in the appended claims.

Figure 4:
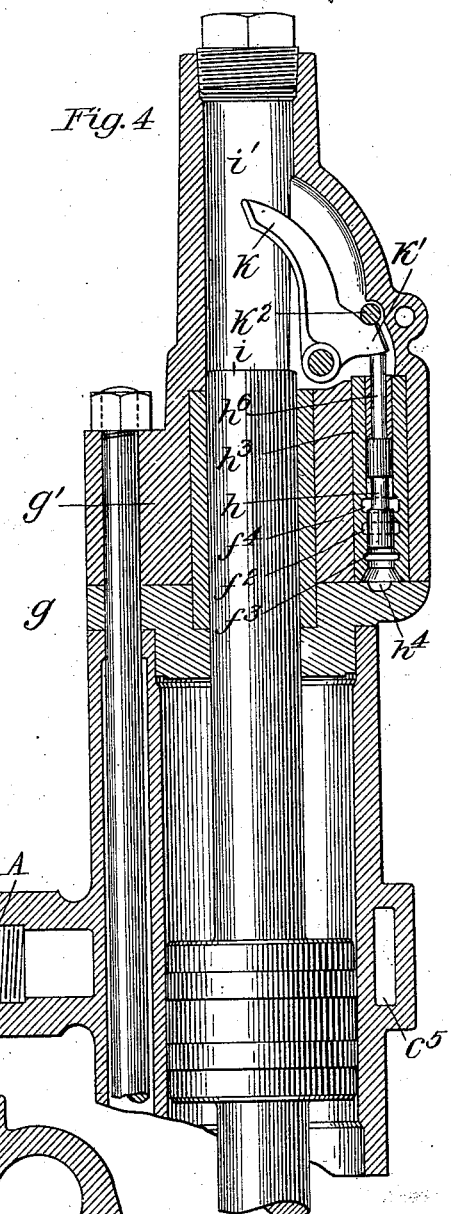
Figure 5:
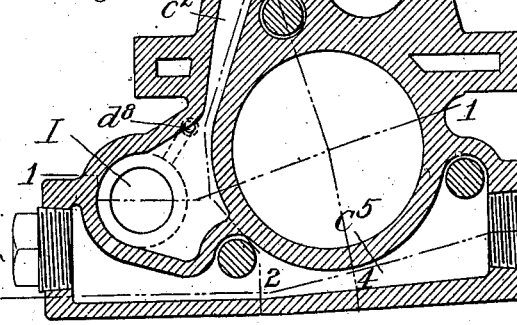

In the drawings, Figure 1 shows an elevation in section, partially broken away, of an engine embodying one form of our invention, the section being taken on the irregular line 1 1 in Fig. 5 and showing the cylinder, piston, and main valve in one position of the latter. Fig. 2 is a similar elevation, broken away, on an irregular section (the cylinder parts, but not the auxiliary valve, being shown on the section-line 2 2 in Fig. 5) to show the inlet-passage and the auxiliary valve, the latter in a position corresponding to the position of the main valve in Fig. 1. Fig. 3 is a similar section on the irregular line 3 3 in Fig. 5, showing the auxiliary valve and its controlled passages. Fig. 4 shows a section on the line 4 4, the auxiliary valve being shown in a reversed position from that in Figs. 2 and 3, and Fig. 5 shows a section on the line 5 5 in Fig. 2.

Referring to the drawings and to the embodiment of our invention which we have there illustrated and shown as applied to an upright channeling-engine, there is provided the main cylinder-body $a$, having a piston $b$ and a piston-rod $b'$. In practice the lower end of the piston-rod is attached to a suitable cross-head, the latter carrying the cutting tool or tools, and the entire cylinder-body, together with its attached parts, is vertically adjustable lengthwise its support; but these features form no necessary part of our invention, and the latter may be applied to other types of engines otherwise constructed and positioned.

The cylinder-body has formed integrally therewith and at one side thereof the main valve-chamber $c$, in which is located the main-piston-controlling valve. Fluid-pressure is constantly admitted to the enlarged central portion $c'$ of the valve-chamber through the inlet-passage $c^2$, which, Figs. 2 and 5, leads about the body of the cylinder to the inlet-opening A, which latter may be connected with any suitable source of fluid-pressure supply. (Not shown.)

The valve-chamber has an upper exhaust-port $c^3$ and a lower exhaust-port $c^4$ in constant communication with the exhaust-passage $c^5$, which latter, Figs. 3 and 5, is formed in the cylinder-walls at the side of the live-pressure chamber $c'$ to connect with the ports $c^3$ and $c^4$ at either end of the latter and leading thence about the cylinder to the exhaust-opening E.

The cylinder-ports $c^6$ and $c^7$ lead from the valve-chamber respectively to the head end and tool end of the cylinder and are each placed alternately in communication with the admission and the exhaust through movement of the controlling-valve.

The main valve $d$ is of the piston type and consists of the piston bodies or spools $d'$ and $d^2$, joined by the stem $d^3$ and controlling, respectively, the upper and lower cylinder-ports $c^6$ and $c^7$. In the raised position of the valve shown in Fig. 1 the lower cylinder-port $c^7$ is open to the lower exhaust-port $c^4$, and the upper cylinder-port $c^6$ communicates with the live-pressure chamber $c'$.

When the valve is reversed or depressed, the port $c^6$ is then placed in communication with the exhaust-port $c^3$ and the lower port $c^7$ in communication with the live-pressure chamber $c'$. This main valve, as in our aforesaid patent, is adapted to be moved by fluid-pressure, and for this purpose there is employed a differential piston, which may be formed separately from the main valve and working in a separate chamber, but which preferably is integral with the main valve and works in the same chamber therewith. To this end the lower piston-body $d^2$ has attached thereto the cup-shaped end $d^4$, slidable within a bushing $d^5$ and providing at its interior a pressure area of relatively small extent constantly exposed to pressure fluid. The latter may be admitted to the chamber formed at the end of the cup in any suitable way, but herein is led thereto through the grooves $d^6$, formed in the bottom of the bushing, from the annular groove $d^7$, the latter being in direct open communication with the live-pressure passage $c^2$ through the passage $d^8$, formed in the walls of the cylinder.

The pressure acting within the cup-shaped end $d^4$ when unresisted maintains the valve raised in the position shown in Fig. 1, but may be overcome and the valve thereby depressed by means of pressure intermittently acting at the opposite and upper end of the valve and upon the comparatively large pressure area formed within the interior of the cup-shaped end $d^9$, formed upon the piston-body $d'$.

The valve works between the two adjustable upper and lower buffers $e$ and $e'$, respectively, which latter engage the cup-shaped ends $d^4$ and $d^9$. These buffers are substantially of the same construction and for the same purpose as those in our prior patent.

The buffer $e$ has the cup $e^2$ within which the cup-shaped piston end moves, the said cup $e^2$ being employed, as in the aforesaid patent, to choke or throttle with varying degrees the exhaust-passage $c^3$ in the manner and for the purpose there described. Pressure is admitted to the chamber formed between the cup $e$ and the cup-shaped piston $d'$ to depress the valve or to exhaust it therefrom to permit the valve to lift, through the intermittent pressure-port $f$, (see Fig. 3,) the latter connecting with the aforesaid chamber through the openings $f'$, formed in the cup $e^2$. The intermittent-pressure port $f$, Fig. 3, extends up through the cylinder-body, the cylinder-plate $g$, and into the cylinder-head $g'$, where is located the auxiliary valve $h$, controlling the pressure actuation of the main valve.

The auxiliary valve $h$ has the two spools $h'$ and $h^2$, joined by a contracted neck and vertically slidable within a valve-bushing $h^3$, suitably located in the cylinder-head. To the under side of the spool $h^2$ there is constantly admitted live pressure through the port $h^4$, the latter, Fig. 2, being directly connected to the live pressure by the passage $h^5$.

This pressure tends constantly to maintain the valve raised, as shown in Fig. 4, but is intermittently opposed by valve-actuating means, which at a suitable time in the piston movement engages the end of the piston tail-rod $i$, the latter secured in any suitable way to the upper or tail end of the piston and passing through the tail-rod chamber $i'$, formed in the upper end of the cylinder-head. The actuating means may be of any suitable form, the same herein consisting of a pivoted finger having a part $k$, adapted to lie within the path of travel of the tail-rod when the latter is depressed and the part $k'$, which engages a protruding end of the auxiliary-valve spindle $h^6$, and by the rise of the latter is pressed against the stop-pin $k^2$ when the piston and tail-rod are depressed.

When the tail-rod rises with the piston, it strikes the end $k$ of the actuating-finger, throwing it from the position shown in Fig. 4 to that shown in Fig. 2 and causing it to depress the auxiliary valve against the constantly-acting pressure at its lower end.

The intermittent-pressure port $f$ enters the auxiliary valve-chamber, Fig. 3, through the upper port $f^2$ and the lower port $f^3$. The latter in the raised position of the valve, Fig. 4, is placed in communication with the live-pressure chamber at the bottom of the valve, and fluid-pressure is admitted therethrough. In the lowered position of the valve, Fig. 3, the upper port $f^2$ will connect with the exhaust-port $f^4$, which latter communicates through the downwardly-leading passage $f^5$ with the main exhaust-opening E. The lower port being then shut off from the live-pressure chamber pressure is exhausted from the intermittent-pressure port.

The operation of the described engine will now be clear. Starting with the piston in the position shown in Fig. 4, moving toward and near the bottom of the cylinder, the tail-rod has been disengaged from the finger $k$ of the actuator, the auxiliary valve is in its upper position, and live pressure is being admitted from the chamber at the bottom of the auxiliary valve through the port $f^3$ and the intermittent-pressure port $f$ to the larger differential area of the main controlling-valve formed at the cup-shaped end $d^9$. The main valve has already been depressed by the admission of this pressure against the constantly-acting pressure at the opposite lower end and is maintained in its depressed position until the tail-rod subsequently rises to reverse the position of the auxiliary valve. In this depressed position of the main valve the pressure is being admitted from the live-pressure chamber through the port $c^7$ to the lower end of the piston, and the latter as soon as its momentum is overcome by the tool striking its work starts on its return upward movement. Admission to the lower end of the piston and exhaust from the upper end thereof continues until the actuating-finger is struck by the end of the tail-rod and moved to depress the auxiliary valve, whereupon, as shown in Fig. 2, the port $f^2$ is placed in communication with the exhaust-port $f^4$, and the pressure thereby exhausted from the upper and larger differential area of the main valve, the constantly-acting pressure at the lower end thereof then acting to raise the same into the position shown in Fig. 1. In this position the pressure is admitted from the live-pressure chamber $c'$ through the upper cylinder-port $c^6$ to the head end of the piston, while communication is established between the lower cylinder-port $c^7$ and the lower exhaust-port $c^4$. The upward movement of the piston continues until its momentum is overcome by the admitted pressure and the downward or working stroke commenced, the position of the main valve and auxiliary valve remaining as shown in Figs. 1 and 2, respectively, until disengagement between the actuating-finger and the tail-rod takes place, whereupon the auxiliary valve rises and the main valve is again depressed, as in Fig. 1.

Other means for actuating the auxiliary valve may be employed, although we have found the form which we have here submitted for illustrative purposes practical and efficient, particularly since it is affected only by the lineal position of the piston.

The form of auxiliary valve is simple, compact, and effective and is less liable to breakage than the slide shown in our prior patent.

It is obvious that certain features of our invention may be employed with or without the main features thereof, it being within the scope of our invention to employ the type of auxiliary valve here disclosed with other constructions of controlling-valve and with other actuating means.

Moreover, it will be understood that our invention is not limited to the details or form or arrangement of parts disclosed, nor to the specific application which for illustrative purposes we have here made of our invention to a channeling-machine.

We claim—

1. An engine having a cylinder, a piston, a main valve controlling the same said valve being constantly pressed in one direction, pressure means for moving said main valve in the opposite direction, an auxiliary valve controlling said pressure means, said auxiliary valve being constantly pressed in one direction, and means connected with the piston for moving the said valve in the opposite direction.

2. An engine having a cylinder, a piston therein, a main controlling-valve therefor constantly pressed in one direction, fluid-pressure means for moving said main valve in the opposite direction, an auxiliary valve for controlling said pressure means, said auxiliary valve being constantly forced in one direction by fluid-pressure means connected with the tail-rod of the piston for moving the auxiliary valve in the opposite direction against the constantly-acting pressure.

3. An engine having a cylinder, a piston, a controlling-valve therefor constantly pressed in one direction, pressure means for moving the main valve in the opposite direction, an auxiliary valve for controlling said pressure means, said auxiliary valve being constantly pressed in one direction, a tail-rod connected to the piston, and oscillating means acted upon by said tail-rod for moving the auxiliary valve in the opposite direction.

4. An engine having a cylinder, a piston therein, a main controlling-valve therefor, pressure means for actuating said main valve, an auxiliary valve for controlling said pressure means, a tail-rod connected to the piston, an oscillating device for the auxiliary valve lying within the path of the tail-rod when the latter is retracted to be engaged by the tail-rod on its return to move said auxiliary valve, and constantly-acting means to move the latter in an opposite direction on the retraction of the tail-rod.

5. An engine having a cylinder, a piston therein, a main controlling-valve therefor, pressure means for actuating the same, an auxiliary valve for controlling said pressure means, and a pivoted actuating member for said auxiliary valve lying within the path of said tail-rod and adapted for intermittent engagement therewith.

6. An engine having a cylinder, a piston therein, a main controlling-valve therefor constantly pressed in one direction, pressure means for moving the same, an auxiliary piston-valve for controlling said pressure means having pressure constantly admitted against one area thereof, a valve-stem protruding from the auxiliary-valve chamber, valve-actuating means adapted for engagement with said stem, said means being intermittently moved by the piston for moving the auxiliary valve against the constantly-acting pressure.

7. An engine having a cylinder, a piston therein, a main controlling-valve, an auxiliary piston-valve having pressure constantly admitted against one area thereof, a passage leading from the main-valve to the auxiliary-valve chamber and said passage normally maintained in communication with the live pressure by constantly-acting pressure against the valve, and actuating means intermittently moved by the piston and adapted to move the auxiliary valve against the constantly-acting pressure to place the said passage in communication with the exhaust.

8. An engine having a cylinder, a piston therein, a main controlling-valve, an auxiliary piston-valve having pressure constantly admitted against one area thereof, a passage leading from the main-valve to the auxiliary-valve chamber and normally maintained by the constantly-acting pressure against the latter in communication with the live pressure a valve-stem, a pivoted finger adapted to press against the same, and a tail-rod connected to the piston, said finger being moved by the tail-rod in one position of the piston to move the auxiliary valve against the constantly-acting pressure and place said passage in communication with the exhaust or in any other position of the piston being free to permit opposite movement of the auxiliary valve under said constantly-acting pressure.

9. An engine having a cylinder, a piston, a main valve, a pressure-actuated differential piston for actuating the main valve, an auxiliary valve for controlling the admission of pressure to and the exhaust from said differential piston, said auxiliary valve being constantly pressed in one direction, and means actuated through piston movement, to move the said valve in the opposite direction.

10. An engine having a cylinder, a piston, a main controlling-valve therefor, a pressure-actuated differential piston for actuating the main valve, an auxiliary valve having pressure constantly admitted against one area thereof, said valve controlling admission to and exhaust from said differential piston, a tail-rod connected with the engine-piston, and means alternately engaged and disengaged by said tail-rod for moving the said auxiliary valve.

11. An engine having a cylinder, a piston therein, a main controlling-valve therefor, a differential piston for actuating the said valve, the said piston having constant pressure upon the smaller differential area thereof, an auxiliary valve adapted to move to admit pressure to or exhaust it from the larger area of said differential piston, said auxiliary valve being constantly pressed in one direction, and means connected to the piston for moving said auxiliary valve in the opposite direction.

12. A direct-acting engine having a cylinder, a piston adapted for direct connection to a tool, a main controlling-valve constantly pressed in one direction, means for admitting pressure to or exhausting the same from said valve to move the same in the opposite direction, an auxiliary valve for controlling said pressure admission or exhausting means, means for constantly acting upon the auxiliary valve to press the same in one direction, and means for actuating said auxiliary valve to move the same in the opposite direction, said means being dependent upon the linear position of the piston, and independent of the displacement thereof about its axis.

13. An engine, having a cylinder, provided with a valve-chamber, a valve, a differential piston connected to control said valve, said piston having a smaller pressure area at one end constantly exposed to the pressure of the live-pressure chamber of the valve, and a larger pressure area at the opposite end, the latter exposed to an intermittent pressure, relatively adjustable abutments to limit the extent of the valve movement, an intermittent-pressure port leading to the larger pressure area, an auxiliary-valve chamber, a piston-valve working therein, a live-pressure passage leading to the auxiliary-valve chamber and to a pressure area of the auxiliary valve whereby the latter is constantly pressed in one direction, a passage leading from the auxiliary-valve chamber to the exhaust, said auxiliary valve normally connecting the intermittent-pressure port with the live-pressure passage thereby to cause admission of pressure to the larger area of the main valve and movement of the latter in one direction, a piston tail-rod and a pivoted actuator within the path of the tail-rod, the latter adapted, when engaged by the tail-rod, to move the auxiliary valve against the constantly-acting pressure, thereby connecting the intermittent-pressure port with the exhaust, and permitting the constantly-acting pressure upon the smaller piston area to move the main valve in the opposite direction.

14. An engine, having a cylinder, provided with a valve-chamber, a valve, a differential piston connected to control said valve, said piston having a smaller pressure area at one end constantly exposed to live pressure and a larger pressure area at the opposite end the latter exposed to an intermittent pressure, and intermittent-pressure port leading to the larger area, an auxiliary-valve chamber, a piston-valve working therein, a live-pressure passage leading to the auxiliary-valve chamber and to a pressure area of the auxiliary valve, tending constantly to press the latter in one direction, a passage leading from the auxiliary-valve chamber to the exhaust, said auxiliary valve normally connecting the intermittent-pressure port with the live-pressure passage, thereby causing admission of pressure to the larger area of the main valve and movement of the latter in one direction, a piston tail-rod and a pivoted actuator within the path of the tail-rod, the latter adapted, when engaged by the tail-rod, to move the auxiliary valve against the constantly-acting pressure, thereby connecting the intermittent-pressure port with the exhaust, and permitting the constantly-acting pressure upon the smaller piston area to move the main valve in the opposite direction.

15. An engine, having a cylinder, provided with a valve-chamber, a valve, a differential piston connected to control said valve, said piston having a smaller pressure area at one end constantly exposed to live pressure and a larger pressure area at the opposite end, the latter exposed to intermittent pressure, an intermittent-pressure port leading to the said chamber, an auxiliary valve-chamber, a piston-valve working therein, a live-pressure passage leading to the auxiliary-valve chamber and to a pressure area of the auxiliary valve tending constantly to press the latter in one direction, a passage leading from the auxiliary-valve chamber to the exhaust, said auxiliary valve normally connecting the intermittent-pressure port with the live-pressure passage, thereby causing admission of pressure to the larger area of the main valve and movement of the latter in one direction, and auxiliary-valve-actuating means adapted to be intermittently actuated by the piston movement to move the auxiliary valve against the constantly-acting pressure, thereby to connect the intermittent-pressure port with the exhaust and permit movement of the main valve in the opposite direction.

16. An engine, having a cylinder provided with a valve-chamber, a valve, a differential piston controlling said valve said piston being constantly pressed in one direction, an intermittent-pressure port to which a pressure area of the valve is exposed, an auxiliary valve constantly pressed in one direction and normally connecting the intermittent-pressure port with the live pressure, and piston-actuated means for intermittently moving the auxiliary valve in the opposite direction to connect said port with the exhaust.

In testimony whereof we have signed our names to this specification in the presence of two subscribing witnesses.

THOMAS OFFICER.
HENRY H. MERCER.

Witnesses:
  ALBERT BALL,
  MORRIS P. HOLMES.